US012670434B2

(12) United States Patent
Komarek et al.

(10) Patent No.: US 12,670,434 B2

(45) Date of Patent: Jun. 30, 2026

(54) MULTIPLE INSTANCE LEARNING MODELS FOR CYBERSECURITY USING JAVASCRIPT OBJECT NOTATION (JSON) TRAINING DATA

(71) Applicant: Cisco Technology, Inc., San Jose, CA (US)

(72) Inventors: Tomas Komarek, Frydek-Mistek (CZ); Stepan Dvorak, Podebrady (CZ); Jan Brabec, Prague (CZ)

(73) Assignee: Cisco Technology, Inc., San Jose, CA (US)

(*) Notice: Subject to any disclaimer, the term of this patent is extended or adjusted under 35 U.S.C. 154(b) by 1049 days.

(21) Appl. No.: 17/749,740

(22) Filed: May 20, 2022

(65) Prior Publication Data

US 2023/0376836 A1 Nov. 23, 2023

(51) Int. Cl.
*G06N 20/00* (2019.01)
*H04L 9/40* (2022.01)

(52) U.S. Cl.
CPC ......... *G06N 20/00* (2019.01); *H04L 63/1441* (2013.01)

(58) Field of Classification Search
None
See application file for complete search history.

(56) References Cited

U.S. PATENT DOCUMENTS

| | | | | |
|---|---|---|---|---|
| 12,034,732 | B2 * | 7/2024 | Lin | H04L 63/20 |
| 2014/0223284 | A1 * | 8/2014 | Rankin, Jr. | G06F 40/169 |
| | | | | 715/234 |
| 2015/0227838 | A1 * | 8/2015 | Wang | G16H 40/40 |
| | | | | 706/12 |
| 2016/0162779 | A1 * | 6/2016 | Marcus | G06N 20/10 |
| | | | | 706/12 |
| 2020/0364346 | A1 * | 11/2020 | Gourisetti | G06F 8/20 |
| 2021/0042442 | A1 * | 2/2021 | Al-Kabra | H04L 67/10 |
| 2022/0057519 | A1 * | 2/2022 | Goldstein | G01S 17/88 |

OTHER PUBLICATIONS

NPL Agarwal Data Platform for Machine Learning 2019.*
NPL Baumann All in One 2017.*
NPL Janisch Hierarchical Multiple Instance Data Classification Jul. 2021.*
NPL Komarek Multiple Instance Learning with BagLevel 2019.*

(Continued)

*Primary Examiner* — Paul M Knight

(74) *Attorney, Agent, or Firm* — Lee & Hayes, P.C.

(57) ABSTRACT

Techniques and architecture are described for converting tree structured data such as, for example, JavaScript Object Notation (JSON) data, into multiple feature vectors to train multiple instance learning (MIL) models for providing cybersecurity in networks. In particular, a data set is provided, wherein the data set comprises a sample configured as a hierarchal tree. The sample is converted into a set of path and value pairs, e.g., flattened into a set of path and value pairs, where the path is a sequence of field names and array indices encoding a position of a value. Each path and value pair of the set of path and value pairs is converted into a respective feature vector to form a set of feature vectors. The set of feature vectors is used to train a multiple instance learning (MIL) model, wherein each feature vector has a same, fixed length.

18 Claims, 6 Drawing Sheets

(56)             References Cited

OTHER PUBLICATIONS

NPL Li Mison A Fast JSON Parser for Data Analytics 2017.*
NPL Liu A New Algorithm of the Best Path Selection 2019.*
NPL Oracle JSON Developers Guide Ch15 Wayback Feb. 2022.*
NPL Ozhan Converting XML Data to JSON 2021.*
NPL Pevny Approximation Capability of Neural Networks 2019.*
NPL Shim Joint Active Feature Acquisition and Classification 2018.*
NPL Carbonneau Multiple Instance Learning A Survey 2016.*
NPL Pevny Nested Multiple Instance Learning in Modelling HTTP Network Traffic 2020.*
NPL Shen Scalable Algorithms for Multi Instance Learning 2017.*
Pevny, Tomas, et al., "Approximation Capability of Neural Networks on Spaces of Probability Measures and Tree Structured Domains," ARXIV, Jun. 3, 2019, 42 pages.
Janisch, Jaromir, et al., "Hierarchical Multiple-Instance Data Classification with Costly Features," ARXIV, Jul. 26, 2021, 42 pages.

* cited by examiner

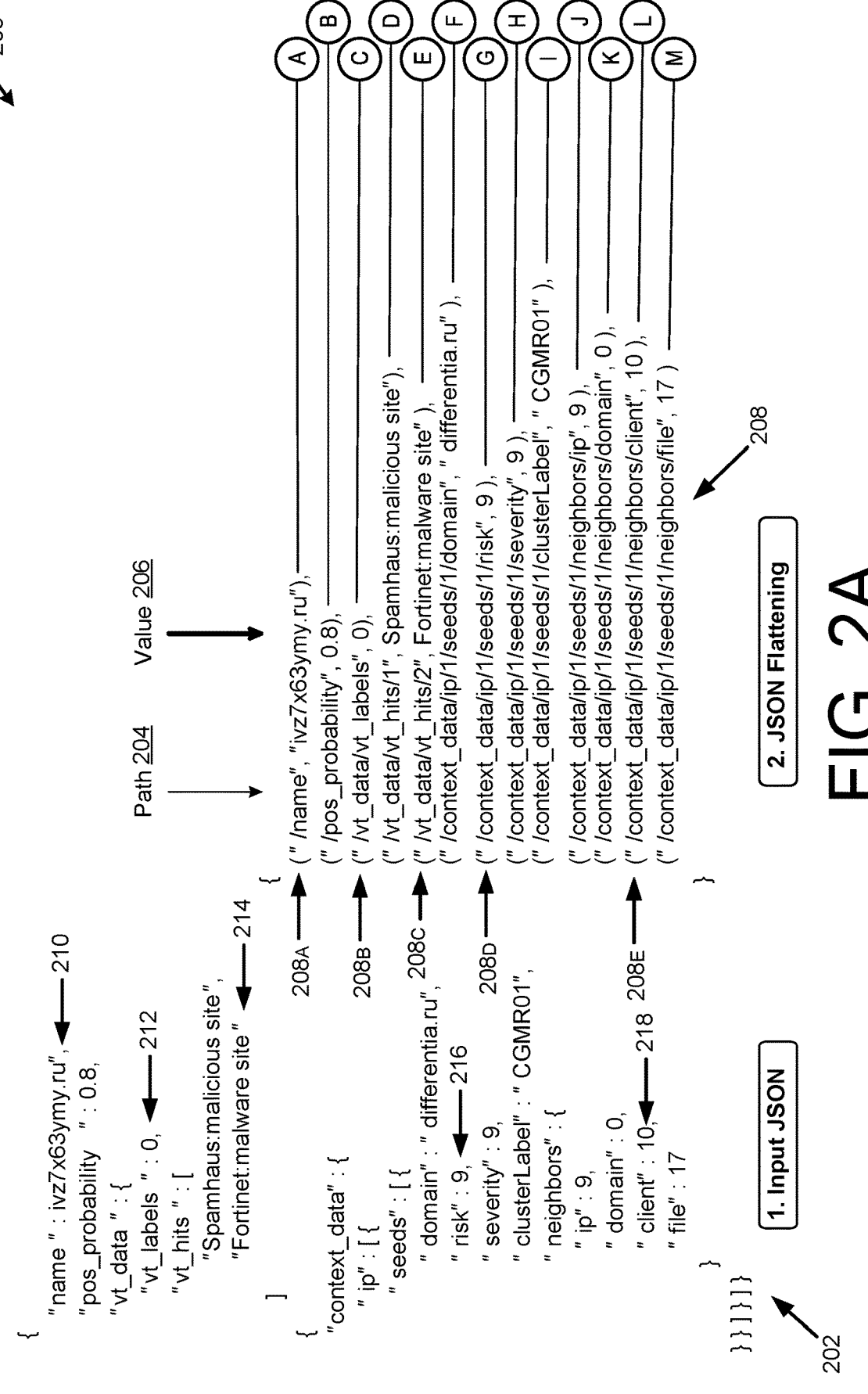

200

1. Input JSON

```
{
  "name " : ivz7x63ymy.ru",                    210
  "pos_probability  " : 0.8,
  "vt_data " : {
    "vt_labels " : 0,                           212
    "vt_hits " : [
      "Spamhaus:malicious site",
      "Fortinet:malware site "                  214
    ]
  },
  "context_data" : {
    " ip" : [ {
      "seeds" : [ {
        " domain" : " differentia.ru",          216
        " risk" : 9,
        " severity" : 9,
        " clusterLabel" : " CGMR01",
        " neighbors" : {
          " ip" : 9,
          " domain" : 0,
          " client" : 10,                       218
          " file" : 17
        }
      } ] }
} } ] } }
```

202

```
                         Path 204        Value 206

{
208A →  (" /name", "ivz7x63ymy.ru"),          A  B
        (" /pos_probability", 0.8),
208B →  (" /vt_data/vt_labels", 0),            C  D
        (" /vt_data/vt_hits/1", Spamhaus:malicious site"),   E
        (" /vt_data/vt_hits/2", Fortinet:malware site" ),    F
208C →  (" /context_data/ip/1/seeds/1/domain", " differentia.ru"),
208D →  (" /context_data/ip/1/seeds/1/risk", 9),             G  H
        (" /context_data/ip/1/seeds/1/severity", 9),
        (" /context_data/ip/1/seeds/1/clusterLabel", " CGMR01"),   I
        (" /context_data/ip/1/seeds/1/neighbors/ip", 9),           J
208E →  (" /context_data/ip/1/seeds/1/neighbors/domain", 0),       K
        (" /context_data/ip/1/seeds/1/neighbors/client", 10),      L
        (" /context_data/ip/1/seeds/1/neighbors/file", 17 )        M
        }
```

208

2. JSON Flattening

FIG. 2A

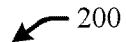

200

224

228

226

220

PathLength()
PathNumberOfFields()
PathNumberOfLists()
PathIndexInFirstList()
PathIndexInLastList()
PathFieldOneHotEncoding([...])
PathFieldHashing(32,seeds=[123])
ValueIsNull()
ValueIsBool()
ValueIsNaN()
ValueIsInf()
ValueIsNumber()
ValueIsString()
ValueStringOneHotEncoding([...])
ValueStringHashing(bins=32,seeds=[123])
ValueStringNgramHashing(ng=3,bins=32)

(A) → { (1.0, 1.0, 0.0, 0.0, ..., 0.0, ..., 1.0, 0.0, 0.0 ),  ← 222A
(B) → (1.0, 1.0, 0.0, 0.0, ..., 0.8, ..., 0.0, 0.0, 0.0 ),
(C) → (1.0, 1.0, 0.0, 0.0, ..., 0.0, ..., 0.0, 0.0, 0.0 ),
(D) → (2.0, 1.0, 1.0, 1.0, ..., 0.0, ..., 0.0, 1.0, 1.0 ),
(E) → (2.0, 1.0, 2.0, 1.0, ..., 0.0, ..., 1.0, 0.0, 1.0 ),
(F) → (5.0, 3.0, 0.0, 2.0, ..., 0.0, ..., 0.0, 1.0, 1.0 ),
(G) → (5.0, 3.0, 0.0, 2.0, ..., 9.0, ..., 0.0, 0.0, 0.0 ),
(H) → (5.0, 3.0, 0.0, 2.0, ..., 9.0, ..., 0.0, 0.0, 0.0 ),
(I) → (5.0, 3.0, 0.0, 2.0, ..., 0.0, ..., 1.0, 1.0, 1.0 ),
(J) → (6.0, 4.0, 0.0, 2.0, ..., 9.0, ..., 0.0, 0.0, 0.0 ),
(K) → (6.0, 4.0, 0.0, 2.0, ..., 0.0, ..., 0.0, 0.0, 0.0 ),
(L) → (6.0, 4.0, 0.0, 2.0, ..., 10., ..., 0.0, 0.0, 0.0 ),
(M) → (6.0, 4.0, 0.0, 2.0, ..., 17., ..., 0.0, 0.0, 0.0 ),  ← 222M
}

3. Feature Extraction

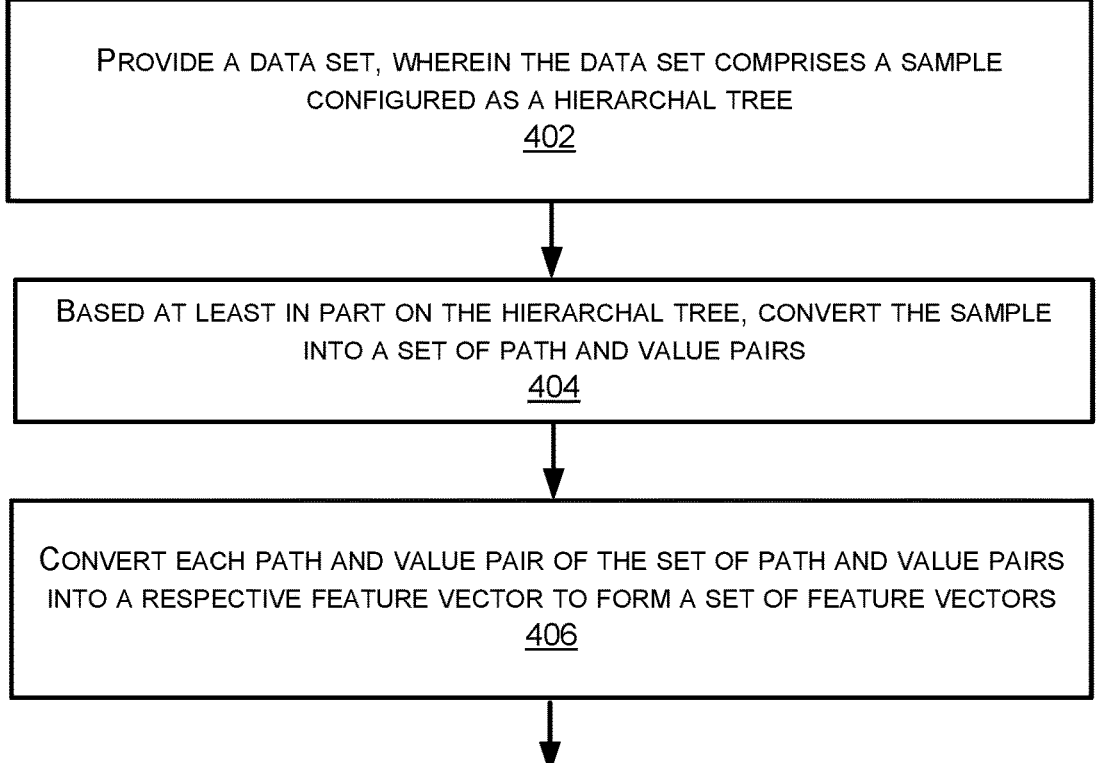

PROVIDE A DATA SET, WHEREIN THE DATA SET COMPRISES A SAMPLE
CONFIGURED AS A HIERARCHAL TREE
402

BASED AT LEAST IN PART ON THE HIERARCHAL TREE, CONVERT THE SAMPLE
INTO A SET OF PATH AND VALUE PAIRS
404

CONVERT EACH PATH AND VALUE PAIR OF THE SET OF PATH AND VALUE PAIRS
INTO A RESPECTIVE FEATURE VECTOR TO FORM A SET OF FEATURE VECTORS
406

USE THE SET OF FEATURE VECTORS TO TRAIN A MULTIPLE INSTANCE LEARNING
(MIL) MODEL, WHEREIN EACH FEATURE VECTOR HAS A SAME, FIXED LENGTH
408

FIG. 4

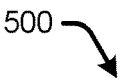
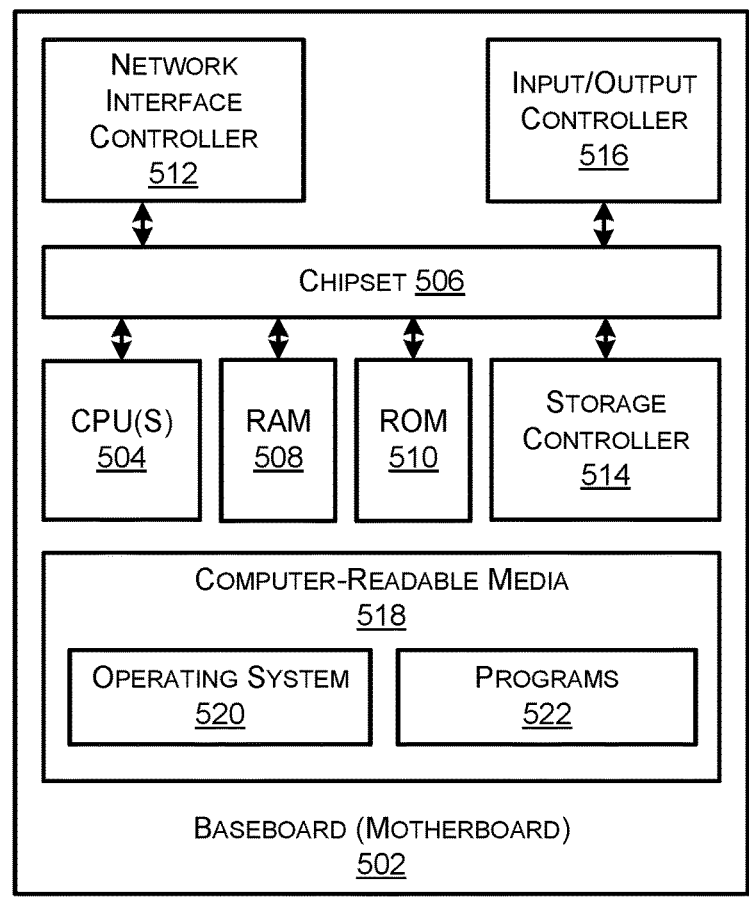
FIG. 5

MULTIPLE INSTANCE LEARNING MODELS FOR CYBERSECURITY USING JAVASCRIPT OBJECT NOTATION (JSON) TRAINING DATA

TECHNICAL FIELD

The present disclosure relates generally to converting JavaScript Object Notation (JSON) data into feature vectors, and in particular to converting JSON data into sets of feature vectors to train multiple instance learning (MIL) models for cybersecurity in networks, e.g., enterprise fabric networks, external networks, extended networks, etc.

BACKGROUND

Enterprise access networks such as, for example, enterprise fabric networks, software defined (SD) access (SD-access) networks, SD networks, overlay networks, etc., (referred to herein as enterprise fabric networks or fabric networks) help in scaling of endpoints in current enterprise networks with an increasing number of wireless devices, e.g., mobile devices, Internet-of-Things devices (IoT), etc., as well as virtual endpoints (virtual machines (VMs)) within devices. In addition to connectivity, the enterprise fabric networks also provide on-demand monitoring and services, e.g., assurance, serviceability, security, etc., for all endpoints in the enterprise fabric network.

In addition to the endpoints directly connected to an enterprise fabric network, the enterprise fabric network also needs to provide connectivity and monitoring services to endpoints in adjacent extended networks. One example of an extended network is an extended wireless access network managed by a wireless controller. Another example of an extended network is an extended wired access network, such as, for example, an extended layer 2 (L2) access network connected to a distribution switch, e.g., a fabric edge, and managed by another aggregator/controller, or a stackwise-virtual (SVL)/flex control plane. Another example of an extended wired access network is an extended IoT device network managed by an IoT controller. The enterprise fabric network also needs to provide connectivity and monitoring services to endpoints in adjacent external networks. An example external network is an external data center or cloud network managed by a data center or cloud control plane/controller. Another example is an external software defined wide access network (SDWAN) managed by a SDWAN controller.

However, it is difficult to provide cybersecurity for all the connected and interacting networks at least in part due to the large number of devices, parties, etc., and the large amounts and types of data that may be used in the cybersecurity of the networks. JavaScript Object Notation (JSON) is a widely used data format designed to represent structured information in the form of a tree of an arbitrary depth and breadth using recursive composition of objects and arrays with four primary data types: string, number, boolean and null, which makes it extremely useful for large amounts and types of data.

Specifically, in cybersecurity, JSON has proven to be particularly useful for its flexibility in representing security entities (e.g., endpoints, host names, emails, applications, etc.) as combinations of heterogeneous outputs from multiple subsystems operating in different domains (e.g., detection engines, telemetry exporters, monitoring services, features providers, scanners, disassemblers, etc.). Such representation is both human and machine readable, and allows the individual subsystems to provide not only their primary output for a given entity (e.g., a probability of maliciousness), but also supporting contextual information (e.g., meta-data, identified events, important and/or interesting samples of content, generated logs, etc.) that may or may not be relevant for some of the final tasks (e.g., threat detection, risk-based prioritization, asset grouping, etc.).

However, although it has been shown that cross-domain analysis yields valuable results, there is a scarcity of tools for automated extraction of patterns directly from JSON data. In particular, typically machine learning (ML) models used to provide cybersecurity utilize data represented as vectors of numbers. JSON data cannot be used though because of varying sizes of the data samples (fields, arrays, objects, values, etc.). While using JSON data is very valuable since it can store large amounts of information from various sources, it is not clear how to represent/extract useful information from the JSON data to use for training ML models. For example, it is very labor intensive to analyze thousands, even millions, of samples of JSON data to determine what is important, which values to extract, etc.

One approach attempting to use JSON data is a task-specific, domain-expert-requiring, and labor-intensive process of representing individual JSONs as numerical fixed-length vectors that are compatible with traditional machine-learning models. One has to identify relevant pieces of information in the JOSN data and design respective extractors, which is a non-trivial task (since JSON data can have a very complex structure) and thus, often leads to sub-optimal results. Additionally, any further changes to the JSON schema need to be reflected in the extractors accordingly, which requires additional human effort.

Another attempt to use JSON data is a process that includes a supervised neural network algorithm that recursively traverses JSON tree nodes to compute a vectorial embedding of the root node. Every JSON value of a primitive type is mapped into a fixed-dimensional vector using parameterized embedding networks. JSON objects and arrays are then embedded using long short-term memory (LSTM)-based recurrent neural networks.

Finally, another attempt to use JSON data includes a tool for proposing a neural network model reflecting a JSON schema inferred from a data set of JSON samples. The proposed model works as a hierarchy of embeddings, where JSON values of primitive types are embedded using parameterized networks. JSON arrays are embedded by pooling networks with aggregation functions (e.g., element-wise maximum and/or mean). Elements of JSON objects are concatenated at the input of the embedding network layer. Unlike the previous attempt to use JSON that was described utilizing a supervised neural network algorithm, the embeddings do not know all of the information about the position of values in the JSON tree. Additionally, the field names are not included in the embeddings as the semantic information is encoded in the structure of the network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A and 2B schematically illustrate an example flow for converting tree structured data such as, for example, JavaScript Object Notation (JSON) data, into multiple feature vectors in the networks of FIG. 1.

FIG. 4 illustrates a flow diagram of an example method for converting tree structured data such as, for example, JavaScript Object Notation (JSON) data, into multiple feature vectors in the networks of FIG. 1.

FIG. 5 is a computer architecture diagram showing an example computer hardware architecture for implementing a device that can be utilized to implement aspects of the various technologies presented herein.

DESCRIPTION OF EXAMPLE EMBODIMENTS

Overview

Figure 1:
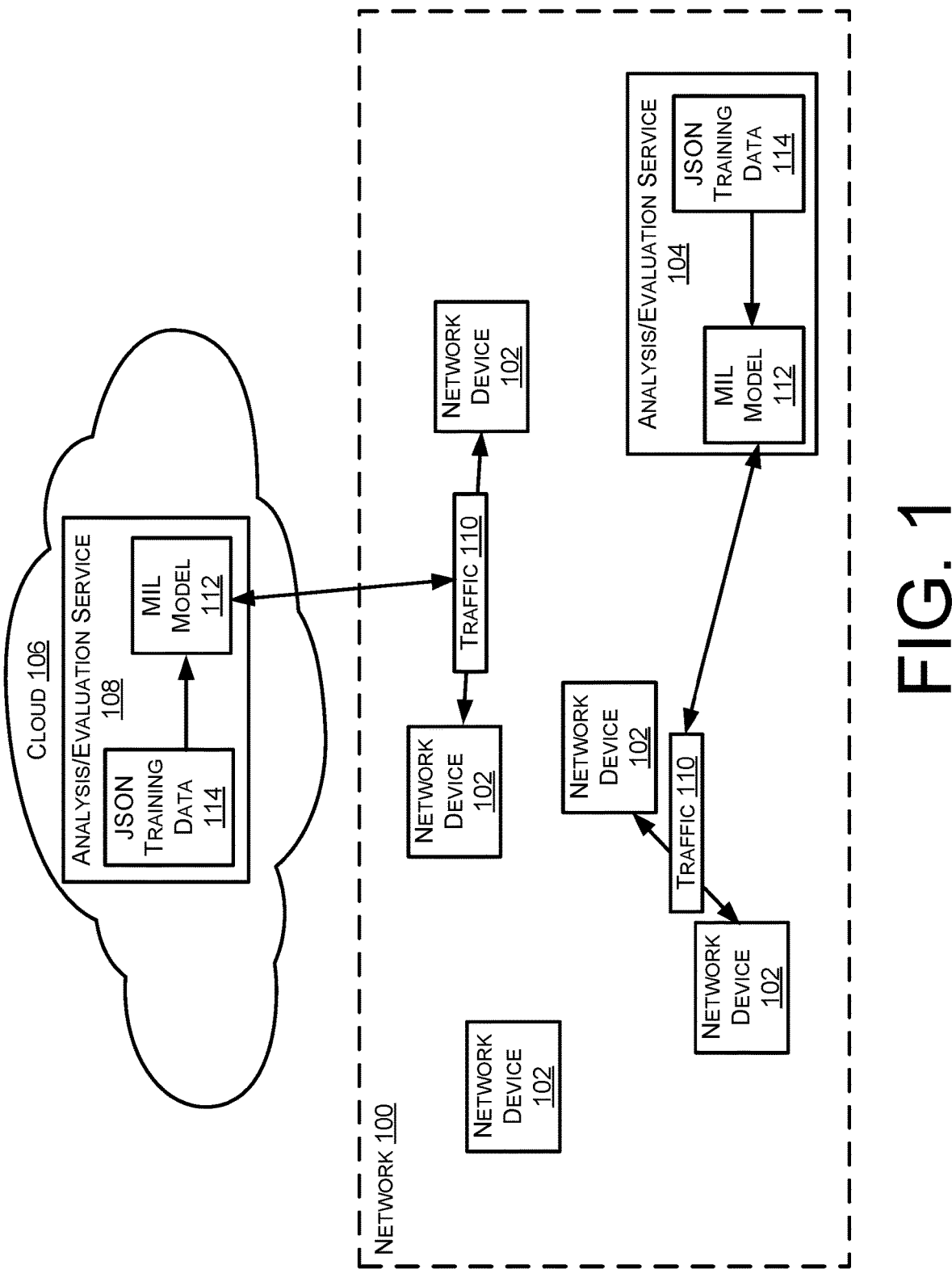
FIG. 1 schematically illustrates an example network arrangement of a portion of a network and a portion of a cloud network.

The present disclosure describes techniques and architecture for converting tree structured data such as, for example, JavaScript Object Notation (JSON) data, into feature vectors. More particularly, the present disclosure describes techniques and architecture for converting JSON data into sets of feature vectors to train multiple instance learning (MIL) models for providing cybersecurity in networks, e.g., enterprise fabric networks, external networks, extended networks, etc.

In particular, the techniques and architecture described herein address the problem of learning models being trained using arbitrary JSON data by transforming each JSON sample of the JSON data into a set of feature vectors and applying multiple instance learning (MIL) models on top of the converted JSON samples. Unlike traditional (e.g., single instance learning) models, MIL models enable learning from a data set consisting of sets of feature vectors of a fixed length (often referred to as "bags") as opposed to single-feature vectors. Note that while the feature vectors have a fixed length, the number of feature vectors may vary across individual bags (i.e., JSON samples) in the data set.

In configurations, the JSON transformation method begins with an input of a JSON sample. The JSON sample is flattened into a set of path and value pairs, where the path is a sequence of field names and array indices encoding a position of a value (i.e., a string, a number, a Boolean value, or a null value) in the JSON tree.

In configurations, each path and value pair is converted into a feature vector by applying a battery of feature extractors to form a bag (i.e., a set of feature vectors). In general, there are two types of feature extractors. One feature extractor is referred to as a path feature extractor. The path feature extractor may extract one or more of a length of the path, a number of field names in the path, a number of arrays in the path, an index in a first array, an index in a last array, one-hot encoding for a predefined list of field names, hashing an arbitrated field name into a fixed range of integers, etc. Another type of feature extractor is generally referred to as a value feature extractor. The value feature extractor generally extracts one or more of determining if the value is a null value type, determining if the value is a Boolean value type, determining if the value is a Boolean value type and whether or not the Boolean equals true or false, determining if the value is a number value type, determining if the value is a number value type and the value itself, determining if the value is a string type value, determining a length of the string if the value is a string type value, one-hot encoding for a predefined list of strings, hashing an arbitrary string into a fixed range of integers, etc.

As will be described herein, the applicability of the JSON transformation method described herein may be evaluated with a task of identifying high-risk host name indicator of compromises (IoCs), e.g., host within a network identified as high-risk IoCs. The evaluation data set contains 548 human-expert annotated host names, out of which 158 correspond to high-risk IoCs (i.e., positive samples) and the rest (398) correspond to negative samples. Each host name is represented as a JSON sample combining outputs from antivirus engines and structured information from a risk map algorithm for the given host name. An average JSON in the data set has a breadth equal to 398 (i.e., the number of values/leaves) and depth equal to five (i.e., the path length). As a MIL model, trained on top of the converted JSON data samples (i.e., bags), an instance selection randomized tree may be employed.

As will be further described herein, the transformation method for JSON data described herein may be compared with two structure-agnostic baseline representations. In the first structure-agnostic baseline representation, scaler representation extracts from each JSON only the ratio of hitting antivirus engines. The second structure-agnostic baseline representation, vectorial representation, then also encodes identifiers of hitting antivirus engines using one-hot encoding. The evaluation was performed as a five-times repeated random trained/test split evaluation with results displayed as average lines indicating true positive rate for a given false positive rate from the five runs. The JSON transformation method described herein outperformed both baseline approaches, especially in the area of a low false positive rate that is important from the application viewpoint.

As an example, a method may include providing a data set, wherein the data set comprises a sample configured as a hierarchal tree. The method may also include converting the sample into a set of path and value pairs. The method may further include based at least in part on the hierarchal tree, converting each path and value pair of the set of path and value pairs into a respective feature vector to form a set of feature vectors.

In configurations, the data set may comprise a JavaScript Object Notation (JSON) data set.

In configurations, the data set may comprise an Extensible Markup Language (XML) data set.

In configurations, where the data set comprises an XML data set, the method may further comprise prior to converting the sample into the set of path and value pairs, converting the XML data set into a JavaScript Object Notation (JSON) data set.

In configurations, the path of each path and value pair may comprise a sequence of field names and array indices encoding a respective position of a respective value within a respective hierarchal tree.

In configurations, each respective value may consist of one of a string, a number, a Boolean value type, or a null value type.

In configurations, converting each path and value pair into the respective feature vector may comprise using a path feature extractor to one or more of (i) extract a length of the path, (ii) extract a number of field names in the path, (iii) extract a number of arrays in the path, (iv) extract an index in a first array or a last array, (v) one-hot encoding for a predefined list of field names, or (vi) hashing an arbitrary field name into a fixed range of integers.

In configurations, converting each path and value pair into the respective feature vector may comprise using a path feature extractor to one or more of (i) determine if a value is null type, (ii) determine if a value is Boolean type, (iii) determine if a value is Boolean type and equals true or false, (iv) determine if a value is a number, (v) determine if the value is a number value type and a value itself, (vi) determine if a value is string type, (vii) determine a length of a string if a value is string type, (viii) determine one-hot encoding for a predefined list of strings, or (ix) hashing an arbitrary string into a fixed range of integers.

In configurations, the method may further comprise using the set of feature vectors to train a multiple instance learning (MIL) model, wherein each feature vector has a same, fixed length.

Thus, the techniques and architecture described herein provide an automated solution that helps eliminate the need of expensive and often ineffective feature engineering. Additionally, domain-specific feature extractors may be easily added to an existing battery of general feature extractors (e.g., is the string value a public/private IP address?). The JSON data transformation method described herein may preserve all information contained in JSON data sets including their structure when there is a limited number of unique string values. This reduces the risk of omitting a piece of information during the feature extraction that might be relevant in some of the learning tasks. Unlike other approaches such as neural network models, the JSON data transformation method described herein does not require JSON data to strictly obey a fixed schema. This allows models to work with JSON data sets whose arrays contain a mix of value types and/or where field names are used as values. Also, the JSON data transformation method does not fail when an unimportant change in the schema appears (e.g., one of the subsystems updates the structure of the output, adds a new field, renames it, etc.). Combining the transformed JSON data sets represented as sets of feature vectors with a MIL model able to identify feature vectors within bags that are responsible for positive predictions (e.g., Instance Selection Randomized Trees), enables the system to provide explanations for predictions by pinpointing the most important path-value pairs in the given JSON sample. These explanations might speed up any subsequent human-analysis. Furthermore, by collecting the important path-value pairs across an entire dataset, it can be determined which subsystems are the most/least valuable. Since the transformed JSON data sets representation is unsupervised, unlike supervised neural network algorithms, it can be used in conjunction with unsupervised MIL models developed for clustering or anomaly detection, which might be useful for tasks like incident-grouping, asset-grouping, etc.

The techniques described herein may be performed by a system and/or device having non-transitory computer-readable media storing computer-executable instructions that, when executed by one or more processors, performs the method described above.

EXAMPLE EMBODIMENTS

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates a portion of a network 100. The network 100 includes multiple network devices 102 such as, for example, routers, switches, hosts, etc. In configurations, the network devices 102 may represent endpoints. In configurations, the network 100 may include an analysis/evaluation service 104, which may be executed by a computing device such as, for example, a server. In configurations, a cloud network 106 may be utilized to provide an analysis/evaluation service 108, instead of or in addition to, the analysis/evaluation service 104 provided in the network 100. As is known, the network 100 and the cloud network 106 each generally includes many more components than are illustrated in FIG. 1. Additionally, the network 100 may represent a fabric network, an extended network, or an external network.

As is known, traffic 110 flows within the network 100 between the network devices 102. The traffic 110 may be packets representing emails, data, etc. Additionally, traffic may flow to and from the network devices 102 to other network devices (not illustrated) in other networks (not illustrated), e.g., a fabric network, an extended network, and/or an external network. Additionally, as is known, applications may execute on one or more network devices 102, data may be stored at and retrieved from one or more network devices 102, services may be provided by one or more network devices 102, etc.

As previously noted, JavaScript Object Notation (JSON) is a widely used data format designed to represent structured information in the form of a tree of an arbitrary depth and breadth using recursive composition of objects and arrays with four primary data types: string, number, boolean and null, which makes it extremely useful for large amounts and types of data. In cybersecurity, JSON has proven to be particularly useful for its flexibility in representing security entities (e.g., endpoints, host names, emails, applications, etc.) as combinations of heterogeneous outputs from multiple subsystems operating in different domains (e.g., detection engines, telemetry exporters, monitoring services, features providers, scanners, disassemblers, etc.). Such representation is both human and machine readable, and allows the individual subsystems to provide not only their primary output for a given entity (e.g., a probability of maliciousness), but also supporting contextual information (e.g., meta-data, identified events, important and/or interesting samples of content, generated logs, etc.) that may or may not be relevant for some of the final tasks (e.g., threat detection, risk-based prioritization, asset grouping, etc.).

When traffic 110 flows within the network 100, the traffic 110 may be analyzed and/or evaluated by the analysis/evaluation service 104 for security threats. Alternatively, the traffic 110 may be analyzed and/or evaluated by the analysis/evaluation service 108 for security threats. The traffic 110 may be analyzed and/or evaluated based on one or more of endpoints, host names, emails, applications, etc. related to the traffic 110. The analysis/evaluation services 104, 108 may analyze and/or evaluate the traffic 110 using a machine learning (ML) model. In configurations, the ML model is a multiple instance learning (MIL) model 112. Thus, in configurations, the MIL model 112 may be trained using one or more data sets 114. The data sets 114 may include data samples configured as hierarchal trees. In configurations, the data sets 114 may be in the form of JSON data that includes JSON samples. In other configurations, the data sets 114 may be in the form of Extensible Markup Language (XML). In some configurations, the XML data sets may be converted to JSON data sets.

Each JSON sample of the JSON data sets 114 may be transformed into a set of feature vectors and applying multiple instance learning (MIL) models on top of the converted JSON samples. Unlike traditional (e.g., single instance learning) models, MIL models enable learning from a data set consisting of sets of feature vectors of a fixed length (often referred to as "bags") as opposed to single-feature vectors. Note that while the feature vectors have a fixed length, the number of feature vectors may vary across individual bags (i.e., JSON samples) in the data set.

Referring to FIGS. 2A and 2B, a JSON transformation method 200 of the present disclosure begins with an input of a JSON sample 202. The JSON sample 202 may be input into one or both of the analysis/evaluation services 104, 108 to perform the JSON transformation method 200. The JSON sample 202 is flattened into a set of path 204 and value 206 pairs 208, where the path is a sequence of field names and array indices encoding a position of a value (i.e., a string, a number, a Boolean value, or a null value) in the JSON tree of the JSON sample 202. For example, a first path and value pair 208*a* indicates a path 204 of "name" and a value 206 of "ivz7x63ymy.ru" in the line 210 of the JSON sample 202. Another path and value pair 208*b*, for example, indicates a path 204 of "vt_data/vt_labels" and a value 206 of "0" in the line 212 of the JSON tree of the JSON sample 202. Another path and value pair 208*c*, for example, indicates a path 204 of "vt_data/vt_hits/2, Fortinet:malware site" and a value 206 of "9" in the line 214 of the JSON tree of the JSON sample 202. Another path and value, for example, pair 208*d* indicates a path 204 of "context_data/ip/1/seeds/1/risk" and a value 206 of "9" in the line 216 of the JSON tree of the JSON sample 202. Another path and value pair, for example, 208*e* indicates a path 204 of "context_data/ip/1/seeds/1/neighbors/client" and a value 206 of "10" in the line 218 of the JSON tree of the JSON sample 202. Thus, as can be seen in FIG. 2A, the tree of the JSON sample 202 is flattened into a set of path and value pairs 208.

Referring to FIG. 2B, the JSON transformation method 200 of the present disclosure continues with each path and value pair 208 being converted into a feature vector 220*a*-220*m* by applying a battery of feature extractors to form a bag (i.e., a set of feature vectors) 222. Each feature vector 222 has a fixed length, e.g., each feature vector 222 has the same length as other feature vectors, the number of feature vectors 222 may vary across individual bags (i.e., JSON samples 202) in the data set.

In general, there are two types of feature extractors. One feature extractor is referred to as a path feature extractor. The path feature extractor may extract one or more of a length of the path, a number of field names in the path, a number of arrays in the path, an index in a first array, an index in a last array, one-hot encoding for a predefined list of field names, hashing an arbitrated field name into a fixed range of integers, etc. In FIG. 2B, the features 224 represent path features.

Another type of feature extractor is generally referred to as a value feature extractor. The value feature extractor generally extracts one or more of determining if the value is a null value type, determining if the value is a Boolean value type, determining if the value is a Boolean value type and whether or not the Boolean equals true or false, determining if the value is a number value type, determining if the value is a number value type and the value itself, determining if the value is a string type value, determining a length of the string if the value is a string type value, one-hot encoding for a predefined list of strings, hashing an arbitrary string into a fixed range of integers, etc. In FIG. 2B, the features 226 represent value features that are not strings while the features 228 represent value features that are strings.

The set of feature vectors 222 from the JSON samples 202 may be used to train the MIL model(s) 112 of the analysis/evaluation services 104, 108. Once trained, the analysis/evaluation services 104, 108 may use the trained MIL model(s) 112 to analyze and/or evaluate traffic 110. For example, traffic 110 in the form of an email may be converted to JSON data, which is provided to at least one of the analysis/evaluation services 104, 108. The JSON data of the email may then be analyzed and/or evaluated by the trained MIL model(s) 114. Based on the analysis and/or evaluation, the analysis/evaluation services 104, 108 may determine whether or not to forward the email on to the appropriate network device. The traffic, (in this example, email) may be evaluated with respect to users, host names, applications, etc.

Figure 3A:
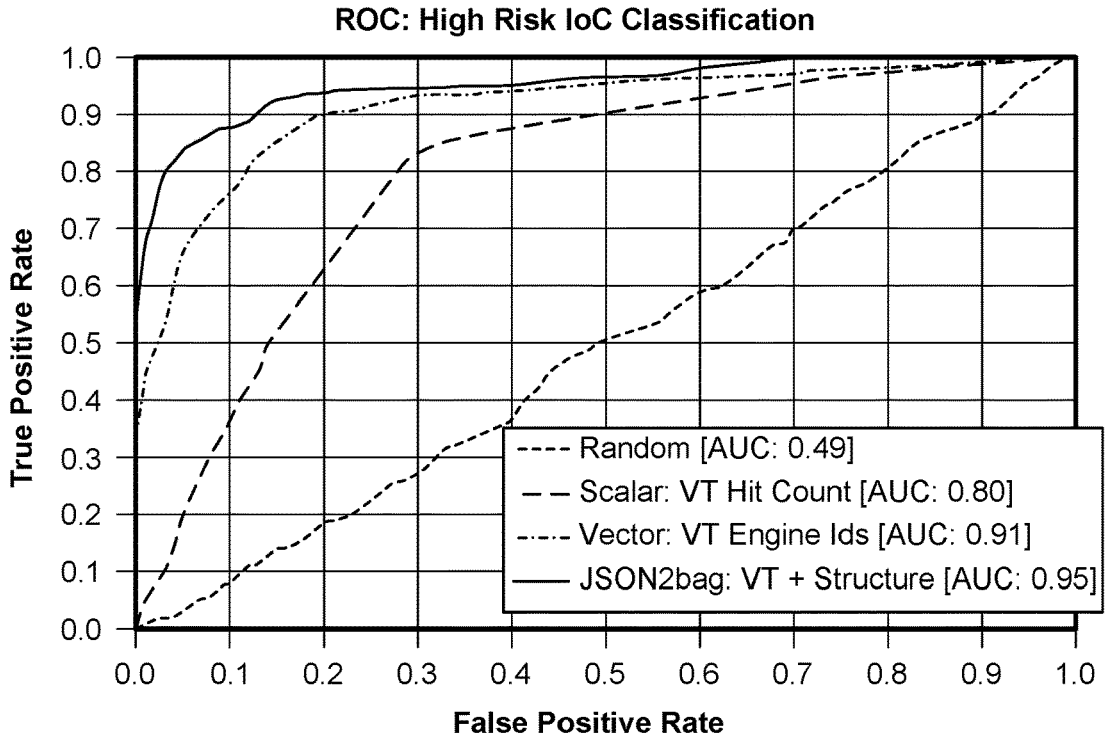
FIGS. 3A and 3B are graphs illustrating the applicability of the JSON transformation method described herein evaluated with a task of identifying high-risk host name indicator of compromises (IoCs), e.g., hosts within a network identified as high-risk IoCs.
Figure 3B:
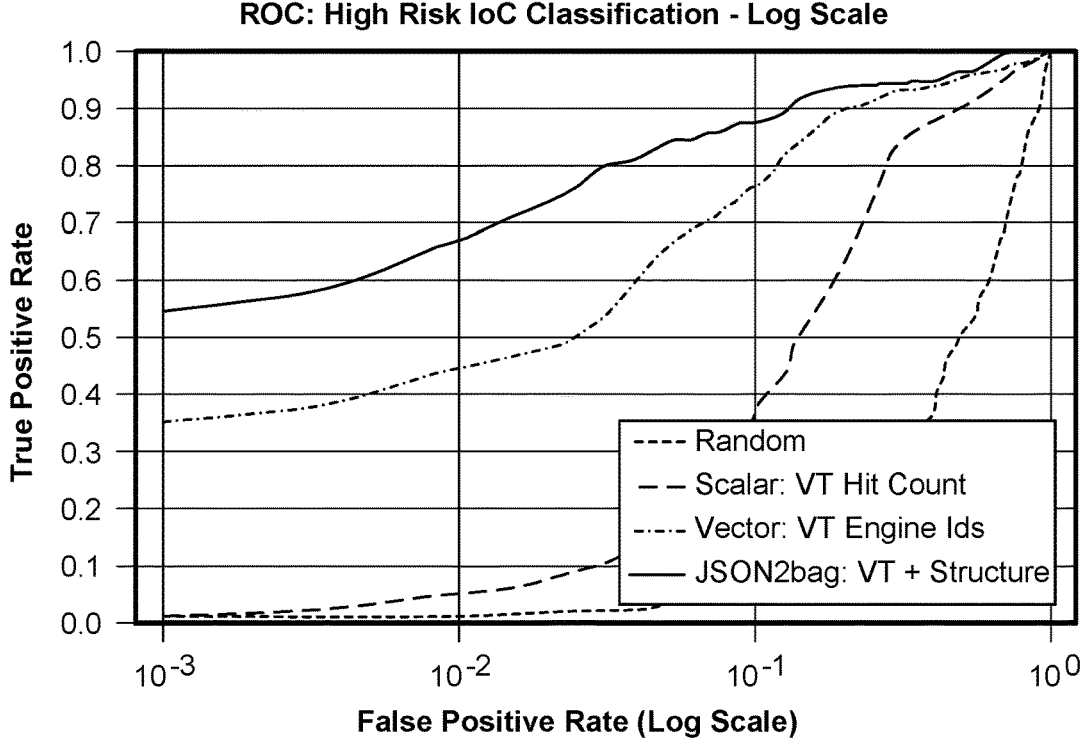

Referring to FIGS. 3A and 3B, the applicability of the JSON transformation method 200 described herein may be evaluated with a task of identifying high-risk host name indicator of compromises (IoCs), e.g., hosts within a network identified as high-risk IoCs. The evaluation data set contains 548 human-expert annotated host names, out of which 158 human-expert annotated host names correspond to high-risk IoCs (i.e., positive samples) and the rest (398 human-expert annotated host names) correspond to negative samples. Each host name is represented as a JSON sample combining outputs from antivirus engines and structured information from a risk map algorithm for the given host name. An average JSON in the data set has a breadth equal to 398 (i.e., the number of values/leaves) and a depth equal to five (i.e., the path length). As a MIL model, trained on top of the converted JSON data samples (i.e., bags), an instance selection randomized tree may be employed.

The transformation method 200 for JSON data described herein (represented in FIGS. 3A and 3B as "JSON2bag") may be compared with two structure-agnostic baseline representations. In the first structure-agnostic baseline representation, scalar representation (represented in FIGS. 3A and 3B as "SCALAR") extracts from each JSON only the ratio of hitting antivirus engines. The second structure-agnostic baseline representation, vectorial representation (represented in FIGS. 3A and 3B as "VECTOR"), then also encodes identifiers of hitting antivirus engines using one-hot encoding.

FIG. 3A illustrates results from the evaluation in terms of a receiver operating characteristic (ROC) curve, while FIG. 3B illustrates results from the evaluation in terms of area under the ROC curve (AUC) metric. Since the evaluation was performed as a five-times repeated random trained/test split evaluation, the results are displayed as average lines indicating true positive rate for a given false positive rate from the five runs. As can be seen from FIGS. 3A and 3B, the JSON transformation method 200 described herein clearly outperformed both baseline approaches, especially in the area of a low false positive rate that is important from the application viewpoint.

FIG. 4 illustrates a flow diagram of an example method 400 and illustrates aspects of the functions performed at least partly by network devices of a network as described with respect to FIGS. 1-3. The logical operations described herein with respect to FIG. 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 4 illustrates a flow diagram of an example method 400 for converting tree structured data such as, for example, JavaScript Object Notation (JSON) data, into feature vectors. More particularly, the example method 400 may convert JSON data into sets of feature vectors to train multiple instance learning (MIL) models for providing cybersecurity in networks, e.g., enterprise fabric networks, external networks, extended networks, etc. In some examples, the method 400 may be performed by a system comprising one or more processors and one or more non-transitory computer-readable media storing computer-executable instructions that, when executed by the one or more processors, cause the one or more processors to perform the method 400.

At 402, a data set is provided, wherein the data set comprises a sample configured as a hierarchal tree. For example, a sample from a data set 114, e.g., JSON sample 202, may be provided to an analysis/evaluation service 104 and/or 108. In configurations, the data set 114 may be in the form of JSON data that includes JSON samples. In other configurations, the data set 114 may be in the form of Extensible Markup Language (XML). In some configurations, the XML data sets may be converted to JSON data sets before being provided.

At 404, based at least in part on the hierarchal tree, the sample is converted into a set of path and value pairs. For example, the JSON sample 202 may be flattened into a set of path 204 and value 206 pairs 208, where the path is a sequence of field names and array indices encoding a position of a value (i.e., a string, a number, a Boolean value, or a null value) in the JSON tree of the JSON sample 202. For example, referring to FIG. 2A, a first path and value pair 208a indicates a path 204 of "name" and a value 206 of "ivz7x63ymy.ru" in the line 210 of the JSON sample 202. Another path and value pair 208b, for example, indicates a path 204 of "vt_data/vt_labels" and a value 206 of "0" in the line 212 of the JSON tree of the JSON sample 202. Another path and value pair 208c, for example, indicates a path 204 of "vt_data/vt_hits/2, Fortinet:malware site" and a value 206 of "9" in the line 214 of the JSON tree of the JSON sample 202. Another path and value, for example, pair 208d indicates a path 204 of "context_data/ip/1/seeds/1/risk" and a value 206 of "9" in the line 216 of the JSON tree of the JSON sample 202. Another path and value pair, for example, 208e indicates a path 204 of "context_data/ip/1/seeds/1/neighbors/client" and a value 206 of "10" in the line 218 of the JSON tree of the JSON sample 202. Thus, as can be seen in FIG. 2A, the tree of the JSON sample 202 is flattened into a set of path and value pairs 208.

At 406, each path and value pair of the set of path and value pairs is converted into a respective feature vector to form a set of feature vectors. For example, with each path and value pair 208 being converted into a feature vector 222a-222m by applying a battery of feature extractors to form a bag (i.e., a set of feature vectors) 216. Each feature vector 222 has a fixed length, e.g., each feature vector 222 has the same length as other feature vectors, the number of feature vectors 222 may vary across individual bags (i.e., JSON samples 202) in the data set. As previously noted, there are two types of feature extractors. One feature extractor is referred to as a path feature extractor. The path feature extractor may extract one or more of a length of the path, a number of field names in the path, a number of arrays in the path, an index in a first array, an index in a last array, one-hot encoding for a predefined list of field names, hashing an arbitrated field name into a fixed range of integers, etc. Another type of feature extractor is generally referred to as a value feature extractor. The value feature extractor generally extracts one or more of determining if the value is a null value type, determining if the value is a Boolean value type, determining if the value is a Boolean value type and whether or not the Boolean equals true or false, determining if the value is a number value type, determining if the value is a number value type and the value itself, determining if the value is a string type value, determining a length of the string if the value is a string type value, one-hot encoding for a predefined list of strings, hashing an arbitrary string into a fixed range of integers, etc.

At 408, the set of feature vectors is used to train a multiple instance learning (MIL) model, wherein each feature vector has a same, fixed length. For example, feature vectors 222 from the JSON samples 202 may be used to train the MIL model(s) 112 of the analysis/evaluation services 104, 108. Once trained, the analysis/evaluation services 104, 108 may use the trained MIL model(s) 112 to analyze and/or evaluate traffic 110. For example, traffic 110 in the form of an email may be converted to JSON data, which is provided to at least one of the analysis/evaluation services 104, 108. The JSON data of the email may then be analyzed and/or evaluated by the trained MIL model(s) 114. Based on the analysis and/or evaluation, the analysis/evaluation services 104, 108 may determine whether or not to forward the email on to the appropriate network device.

Thus, the techniques and architecture described herein provide an automated solution that helps eliminate the need of expensive and often ineffective feature engineering. Additionally, domain-specific feature extractors may be easily added to an existing battery of general feature extractors (e.g., is the string value a public/private IP address?). The JSON data transformation method described herein may preserve all information contained in JSON data sets including their structure when there is a limited number of unique string values. This reduces the risk of omitting a piece of information during the feature extraction that might be relevant in some of the learning tasks. Unlike other approaches such as neural network models, the JSON data transformation method described herein does not require JSON data to strictly obey a fixed schema. This allows models to work with JSON data sets whose arrays contain a mix of value types and/or where field names are used as values. Also, the JSON data transformation method does not fail when an unimportant change in the schema appears (e.g., one of the subsystems updates the structure of the output, adds a new field, renames it, etc.). Combining the transformed JSON data sets represented as sets of feature vectors with a MIL model able to identify feature vectors within bags that are responsible for positive predictions (e.g., Instance Selection Randomized Trees), enables the system to provide explanations for predictions by pinpoint- ing the most important path-value pairs in the given JSON sample. These explanations might speed up any subsequent human-analysis. Furthermore, by collecting the important path-value pairs across an entire dataset, it can be deter- mined which subsystems are the most/least valuable. Since the transformed JSON data sets representation is unsuper- vised, unlike supervised neural network algorithms, it can be used in conjunction with unsupervised MIL models devel- oped for clustering or anomaly detection, which might be useful for tasks like incident-grouping, asset-grouping, etc.

FIG. 5 shows an example computer architecture for a computing device 500 capable of executing program com- ponents for implementing the functionality described above. In configurations, one or more of the computing devices 500 may be used to implement one or more of the components of FIGS. 1-4. The computer architecture shown in FIG. 5 illustrates a conventional server computer, workstation, desktop computer, laptop, tablet, network appliance, e-reader, smartphone, or other computing device, and can be utilized to execute any of the software components pre- sented herein. The computing device 500 may, in some examples, correspond to a physical device or resources described herein.

The computing device 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computing device 500.

The CPUs 504 perform operations by transitioning from one discrete, physical state to the next through the manipu- lation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders- subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computing device 500. The chipset 506 can further provide an interface to a computer-readable storage medium such as a read-only memory ("ROM") 510 or non-volatile RAM ("NVRAM") for storing basic routines that help to startup the computing device 500 and to transfer information between the various components and devices. The ROM 510 or NVRAM can also store other software components necessary for the operation of the computing device 500 in accordance with the configurations described herein.

The computing device 500 can operate in a networked environment using logical connections to remote computing devices and computer systems through a network, such as the arrangement 100. The chipset 506 can include function- ality for providing network connectivity through a NIC 512, such as a gigabit Ethernet adapter. In configurations, the NIC 512 a smart NIC (based on data processing units (DPUs)) that can be plugged into data center servers to provide networking capability. The NIC 512 is capable of connecting the computing device 500 to other computing devices over the networks of the arrangement 100. It should be appreci- ated that multiple NICs 512 can be present in the computing device 500, connecting the computer to other types of networks and remote computer systems.

The computing device 500 can be connected to a storage device 518 that provides non-volatile storage for the com- puter. The storage device 518 can store an operating system 520, programs 522, and data, which have been described in greater detail herein. The storage device 518 can be con- nected to the computing device 500 through a storage controller 514 connected to the chipset 506. The storage device 518 can consist of one or more physical storage units. The storage controller 514 can interface with the physical storage units through a serial attached SCSI ("SAS") inter- face, a serial advanced technology attachment ("SATA") interface, a fiber channel ("FC") interface, or other type of interface for physically connecting and transferring data between computers and physical storage units.

The computing device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computing device 500 can store infor- mation to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present descrip- tion, with the foregoing examples provided only to facilitate this description. The computing device 500 can further read information from the storage device 518 by detecting the physical states or characteristics of one or more particular locations within the physical storage units.

In addition to the mass storage device 518 described above, the computing device 500 can have access to other computer-readable storage media to store and retrieve infor- mation, such as program modules, data structures, or other data. It should be appreciated by those skilled in the art that computer-readable storage media is any available media that provides for the non-transitory storage of data and that can be accessed by the computing device 500. In some examples, the operations performed by the cloud network, and or any components included therein, may be supported by one or more devices similar to computing device 500. Stated otherwise, some or all of the operations described herein may be performed by one or more computing devices 500 operating in a cloud-based arrangement.

By way of example, and not limitation, computer-read- able storage media can include volatile and non-volatile, removable and non-removable media implemented in any method or technology. Computer-readable storage media includes, but is not limited to, RAM, ROM, erasable pro- grammable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computing device 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computing device 500.

In one embodiment, the storage device 518 or other computer-readable storage media is encoded with computer-executable instructions which, when loaded into the computing device 500, transform the computer from a general-purpose computing system into a special-purpose computer capable of implementing the embodiments described herein. These computer-executable instructions transform the computing device 500 by specifying how the CPUs 504 transition between states, as described above. According to one embodiment, the computing device 500 has access to computer-readable storage media storing computer-executable instructions which, when executed by the computing device 500, perform the various processes described above with regard to FIGS. 1-4. The computing device 500 can also include computer-readable storage media having instructions stored thereupon for performing any of the other computer-implemented operations described herein.

The computing device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computing device 500 might not include all of the components shown in FIG. 5, can include other components that are not explicitly shown in FIG. 5, or might utilize an architecture completely different than that shown in FIG. 5.

The computing device 500 may support a virtualization layer, such as one or more virtual resources executing on the computing device 500. In some examples, the virtualization layer may be supported by a hypervisor that provides one or more virtual machines running on the computing device 500 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

providing a data set, wherein the data set comprises a sample configured as a hierarchal tree;

based at least in part on the hierarchal tree, converting the sample into a set of path and value pairs;

converting each path and value pair of the set of path and value pairs into a respective feature vector to form a set of feature vectors, wherein each feature vector of the set of feature vectors has a fixed length identical to other feature vectors of the set of feature vectors, and wherein the fixed length corresponds to a predetermined total number of path and feature values of the path and value pairs;

training one or more multiple instance learning models (MIL) using the set of feature vectors to provide one or more trained MIL models;

analyzing, using the one or more trained MIL models, traffic within a network; and based at least in part on the analyzing, determining whether to forward the traffic on to a network device.

2. The method of claim 1, wherein the data set comprises a JavaScript Object Notation (JSON) data set.

3. The method of claim 1, wherein the data set comprises an Extensible Markup Language (XML) data set.

4. The method of claim 3, further comprising:

prior to converting the sample into the set of path and value pairs, converting the XML data set into a JavaScript Object Notation (JSON) data set.

5. The method of claim 1, wherein the path of each path and value pair comprises a sequence of field names and array indices encoding a respective position of a respective value within a respective hierarchal tree.

6. The method of claim 5, wherein each respective value consists of one of a string, a number, a Boolean value type, or a null value type.

7. The method of claim 1, wherein converting each path and value pair into the respective feature vector comprises using a path feature extractor to one or more of (i) extract a length of the path, (ii) extract a number of field names in the path, (iii) extract a number of arrays in the path, (iv) extract an index in a first array or a last array, (v) one-hot encoding for a predefined list of field names, or (vi) hashing an arbitrary field name into a fixed range of integers.

8. The method of claim 1, wherein converting each path and value pair into the respective feature vector comprises using a path feature extractor to one or more of (i) determine if a value is null type, (ii) determine if a value is Boolean type, (iii) determine if a value is Boolean type and equals true or false, (iv) determine if a value is a number, (v) determine if the value is a number value type and a value itself, (vi) determine if a value is string type, (vii) determine a length of a string if a value is string type, (viii) determine one-hot encoding for a predefined list of strings, or (ix) hashing an arbitrary string into a fixed range of integers.

9. A system comprising:

one or more processors; and one or more non-transitory computer-readable media storing computer-executable instructions that, when executed by the one or more processors, cause the one or more processors to perform actions comprising:

providing a data set, wherein the data set comprises a sample configured as a hierarchal tree;

based at least in part on the hierarchal tree, converting the sample into a set of path and value pairs;

converting each path and value pair of the set of path and value pairs into a respective feature vector to form a set of feature vectors, wherein each feature vector of the set of feature vectors has a fixed length identical to other feature vectors of the set of feature vectors, and wherein the fixed length corresponds to a predetermined total number of path and feature values of the path and value pairs;

training one or more multiple instance learning models (MIL) using the set of feature vectors to provide one or more trained MIL models;

analyzing, using the one or more trained MIL models, traffic within a network; and based at least in part on the analyzing, determining whether to forward the traffic on to a network device.

10. The system of claim 9, wherein the data set comprises a JavaScript Object Notation (JSON) data set.

11. The system of claim 9, wherein the data set comprises an Extensible Markup Language (XML) data set.

12. The system of claim 11, wherein the actions further comprise:

prior to converting the sample into the set of path and value pairs, converting the XML data set into a JavaScript Object Notation (JSON) data set.

13. The system of claim 9, wherein the path of each path and value pair comprises a sequence of field names and array indices encoding a respective position of a respective value within a respective hierarchal tree.

14. The system of claim 13, wherein each respective value consists of one of a string, a number, a Boolean value type, or a null value type.

15. The system of claim 9, wherein converting each path and value pair into the respective feature vector comprises using a path feature extractor to one or more of (i) extract a length of the path, (ii) extract a number of field names in the path, (iii) extract a number of arrays in the path, (iv) extract an index in a first array or a last array, (v) one-hot encoding for a predefined list of field names, or (vi) hashing an arbitrary field name into a fixed range of integers.

16. The system of claim 9, wherein converting each path and value pair into the respective feature vector comprises using a path feature extractor to one or more of (i) determine if a value is null type, (ii) determine if a value is Boolean type, (iii) determine if a value is Boolean type and equals true or false, (iv) determine if a value is a number, (v) determine if the value is a number value type and a value itself, (vi) determine if a value is string type, (vii) determine a length of a string if a value is string type, (viii) determine one-hot encoding for a predefined list of strings, or (ix) hashing an arbitrary string into a fixed range of integers.

17. One or more non-transitory computer-readable media storing computer-executable instructions that, when executed by one or more processors, cause the one or more processors to perform actions comprising:

providing a data set, wherein the data set comprises a sample configured as a hierarchal tree;

based at least in part on the hierarchal tree, converting the sample into a set of path and value pairs;

converting each path and value pair of the set of path and value pairs into a respective feature vector to form a set of feature vectors, wherein each feature vector of the set of feature vectors has a fixed length identical to other feature vectors of the set of feature vectors, and wherein the fixed length corresponds to a predetermined total number of path and feature values of the path and value pairs;

training one or more multiple instance learning models (MIL) using the set of feature vectors to provide one or more trained MIL models;

analyzing, using the one or more trained MIL models, traffic within a network; and based at least in part on the analyzing, determining whether to forward the traffic on to a network device.

18. The one or more non-transitory computer-readable media of claim 17, wherein the data set comprises a JavaScript Object Notation (JSON) data set.

\* \* \* \* \*